United States Patent
Mang et al.

(10) Patent No.: US 10,760,703 B2
(45) Date of Patent: Sep. 1, 2020

(54) VALVE WITH A SLIDING MECHANISM

(71) Applicant: SVM Schultz Verwaltungs—GmbH & Co. KG, Memmingen (DE)

(72) Inventors: Helmut Mang, Memmingen (DE); Florian Schreiber, Weissenhorn (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 15/886,557

(22) Filed: Feb. 1, 2018

(65) Prior Publication Data
US 2018/0224022 A1 Aug. 9, 2018

(30) Foreign Application Priority Data
Feb. 3, 2017 (DE) .................. 10 2017 102 205

(51) Int. Cl.
*F16K 31/06* (2006.01)
*F16K 27/04* (2006.01)
*F16K 11/07* (2006.01)

(52) U.S. Cl.
CPC .......... *F16K 31/0668* (2013.01); *F16K 11/07* (2013.01); *F16K 27/048* (2013.01);
(Continued)

(58) Field of Classification Search
CPC ............ F16K 31/0668; F16K 27/048; F16K 31/0613; F16K 31/0675; F16K 11/07;
(Continued)

(56) References Cited

U.S. PATENT DOCUMENTS 2,404,514 A * 7/1946 McClure ............. F16K 31/0693
251/129.07
4,947,893 A * 8/1990 Miller ................. F16H 61/0021
137/625.65
(Continued)

FOREIGN PATENT DOCUMENTS

CN 203703241 U 7/2014
CN 204647421 U 9/2015
(Continued)

OTHER PUBLICATIONS

European Search Report for Application 18154291, report dated Jun. 25, 2018, 2 pgs.

*Primary Examiner* — John Bastianelli
(74) *Attorney, Agent, or Firm* — KPPB LLP

(57) ABSTRACT

A valve with a sliding mechanism is described. In one embodiment, the valve has a housing and a valve housing, wherein the housing accommodates an electromagnet and the valve housing accommodates a valve part, and the housing, facing the valve housing, has a magnetic core and the magnetic core in the electromagnet forms an armature compartment base which delimits the armature compartment and against which the armature movably mounted in the armature compartment bears in a first position of the electromagnet, and the magnetic core has a penetrating opening in the region of the armature compartment to accommodate an armature bar operatively connected to the armature and the valve housing accommodates a sliding sleeve which extends along a longitudinal axis.

19 Claims, 2 Drawing Sheets

Figure 1:
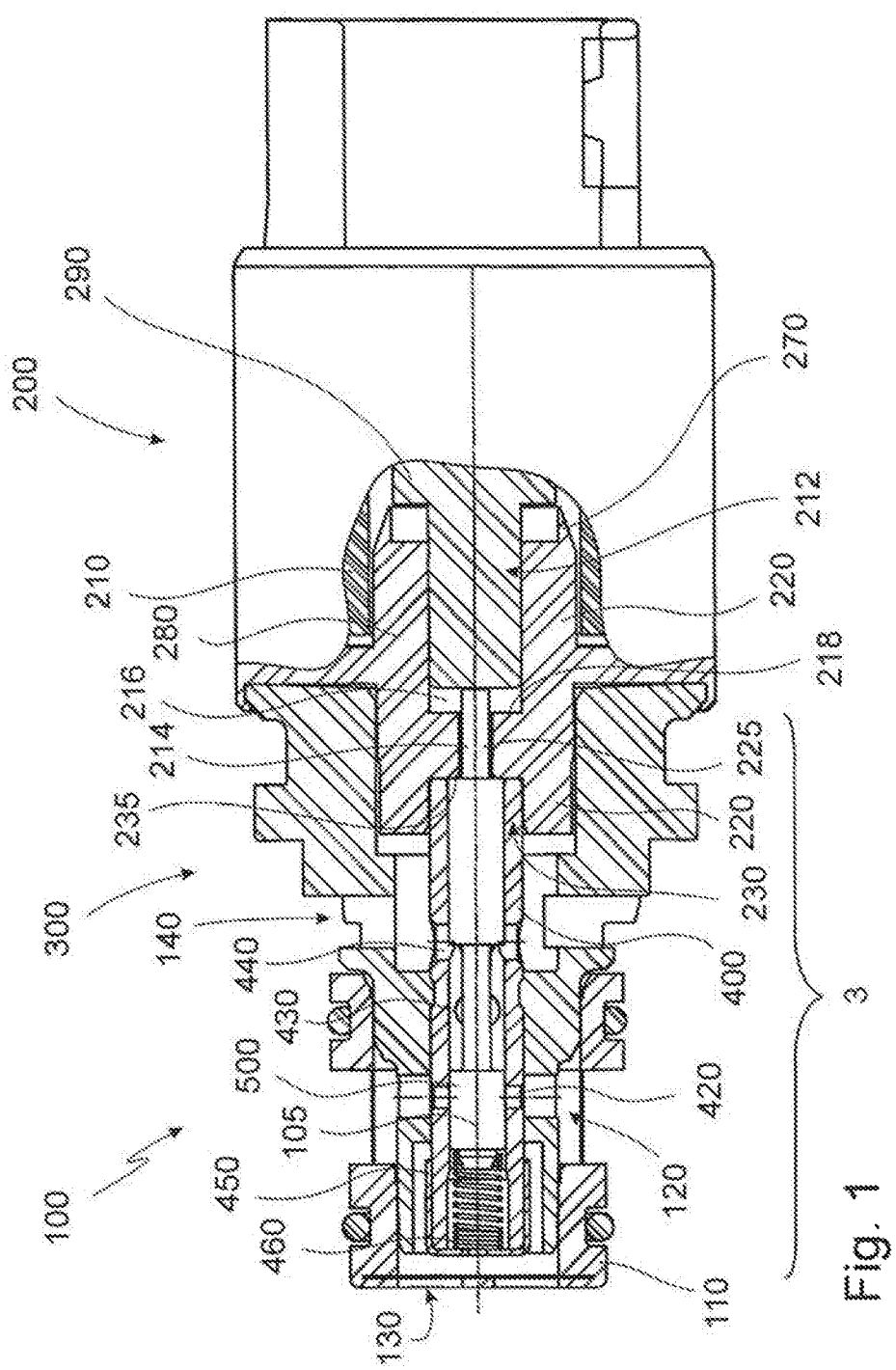

(52) U.S. Cl.
CPC ...... *F16K 31/0613* (2013.01); *F16K 31/0675* (2013.01); *Y10T 137/86622* (2015.04); *Y10T 137/87217* (2015.04)

(58) Field of Classification Search
CPC ..... F16H 2061/0253; Y10T 137/87217; Y10T 137/86622
USPC ...... 251/129.07, 129.15; 137/625.65, 596.17
See application file for complete search history.

(56) References Cited

U.S. PATENT DOCUMENTS

| | | | | |
|---|---|---|---|---|
| 5,911,400 A | * | 6/1999 | Niethammer | F16K 27/041 251/129.08 |
| 5,918,635 A | * | 7/1999 | Wang | F16K 31/0693 137/625.65 |
| 6,415,820 B1 | * | 7/2002 | Gluf, Jr. | B62D 5/062 137/625.65 |
| 6,523,560 B1 | * | 2/2003 | Williams | B81B 3/0024 251/129.07 |
| 6,792,975 B2 | * | 9/2004 | Erickson | F16K 31/0613 137/625.65 |
| 6,918,409 B1 | * | 7/2005 | Parker | F02M 37/0023 251/129.07 |
| 8,991,428 B2 | * | 3/2015 | Holmes | F16K 31/0613 137/625.65 |
| 2013/0062542 A1 | * | 3/2013 | Greeb | F15B 13/0406 251/129.01 |
| 2016/0103455 A1 | * | 4/2016 | Bowden | F16K 31/041 137/484.2 |
| 2016/0178079 A1 | * | 6/2016 | Schneider | F16K 27/029 137/798 |
| 2017/0159832 A1 | * | 6/2017 | Hilzendegen | F16K 3/34 |

FOREIGN PATENT DOCUMENTS

| | | |
|---|---|---|
| CN | 205678213 U | 11/2016 |
| DE | 19535945 A1 | 4/1997 |
| DE | 19729935 A1 * | 1/1999 |
| DE | 102004017088 A1 * | 10/2005 |
| DE | 102006001142 B3 | 6/2007 |
| DE | 102009006654 B3 | 10/2010 |
| DE | 102014004796 A1 * | 8/2015 |
| WO | 2015036076 A1 | 3/2015 |

* cited by examiner

VALVE WITH A SLIDING MECHANISM

BACKGROUND OF THE INVENTION

The invention relates to a valve, in particular a slide valve, which has a housing and a valve housing, wherein the housing accommodates an electromagnet and the valve housing accommodates a valve part, and the housing, facing the valve housing, has a magnetic core, and the magnetic core in the electromagnet forms an armature compartment base which delimits the armature compartment and against which the armature movably mounted in the armature compartment bears in a first position of the electromagnet and the magnetic core has a penetrating bore in the region of the armature compartment to accommodate an armature bar operatively connected to the armature and the valve housing accommodates a sliding sleeve which extends along a longitudinal axis.

Valves described in the introduction, in particular slide valves, are used in the prior art in order to regulate the fluid pressure, that is to say the pressure of gaseous or liquid media. In this case such valves are designed as a pressure regulating valve, which means that a corresponding pressure level of the fluid at the working connection corresponds to a control variable set on the inlet side, for example the electrical current.

Because they are designed as pressure-regulating valves, previously described valves have a plurality of positions which are associated with a plurality of positions of the electromagnet, in particular the location of the armature of the electromagnet. The coil of the electromagnet is supplied with electrical current, on the basis of which a magnetic field is formed which moves the armature against the force of a restoring spring. The positions of the electromagnet correspond to different positions or locations of the various elements of the electromagnet or of the valve, for example the control piston.

A typical field of use of such valves is the control of automatic transmissions in the automotive industry. Recently here, in particular due to energy saving considerations, the pressure potential at the pressure connection of the valve on the inlet side is configured very much more flexibly, wherein, even with such a relatively wide pressure range predetermined on the inlet side, the valves employed are expected to provide satisfactory control behavior.

BRIEF SUMMARY OF THE INVENTION

The object of the invention is to provide a valve which satisfies the aforementioned conditions.

In order to achieve this object the invention is based on a valve as described in the introduction and proposes that the housing has at least one support surface, against which the sliding sleeve bears, and the penetrating bore opens into the bearing surface and a control piston movable against the force of a restoring spring is arranged in the sliding sleeve, is operatively connected to the armature bar and bears against the bearing surface in a second position of the electromagnet.

The idea underlying the invention is that it has been found that the control behavior of valves according to the invention, in particular in the required pressure ranges, is considerably improved if the fewest possible resilient components, such as for example springs etc., are used in the valve. The design is chosen so that minimum tolerance chains exist, which have been compensated for in the prior art by additional springs. Therefore the invention proposes that the elements required for the precise control characteristic are supported on the magnetic core, of which the surfaces provided for this purpose (bearing surface and armature compartment base) can be machined very precisely relative to one another in a clamping process. This may also be considered as an independent feature which is essential to the invention.

This results in a significant advantage of a variant of the proposal, wherein no adjusting device is provided for the location of the armature relative to the armature compartment base in the second position of the electromagnet. Thus the spring provided in the adjusting device is also avoided! It has been observed that the different characteristics of the springs in the prior art do not make it possible to produce pressure regulating valves which provide a sufficiently reproducible characteristic in a wide range of inlet pressures. This relates to the problem that the current/pressure characteristic at a first low inlet pressure as specified should be equal to (or within the predetermined tolerances of) a current/pressure characteristic at a second (significantly) higher inlet pressure. This requirement is met by the proposal according to the invention.

In this case pressure ranges of, for example, 1 bar to 40 bars, preferably in a pressure range from 2 bars to 25 bars, are meant.

The bearing surface can be formed in particular on the magnetic core.

According to a preferred embodiment it is provided that the magnetic core is formed in one piece. It may also be provided that the magnetic core is machined from one single blank. As a result, precise end positions for the components which are movable relative to the magnetic core, in particular the armature and the control piston, can be predetermined by means of the production or machining of the magnetic core. Within the context of the invention it has been recognized that sufficiently precise machining is possible, which has overcome a common prejudice in the production of valves. For example, the complete machining of the magnetic core can take place in a clamping process. It is advantageously possible to dispense with additional components such as springs or distance pieces, by means of which, in the case of valves known from the prior art, manufacturing tolerances were compensated for. This simplifies the production and saves on components.

According to a preferred embodiment it is provided that the bearing surface is formed directly on the magnetic core. Thus it is advantageously possible to dispense with components such as distance pieces or springs.

According to a preferred embodiment it is provided that no spring and/or no distance piece is arranged between the control piston and the bearing surface. According to a further preferred embodiment it is provided that no spring and/or no distance piece is arranged between the sliding sleeve and the bearing surface. Thus, typically, the control piston and/or the sliding sleeve rest directly on the bearing surface, which brings with it the advantages already mentioned above.

According to a preferred embodiment it is provided that the bearing surface is formed directly on the magnetic core. This is advantageous in particular because it is possible to dispense with distance pieces or similar components. The precise position of the armature compartment base and thus of a limitation of the movement of the armature is advantageously fixed during the machining operation of the magnetic core.

According to a preferred embodiment no spring and/or no distance piece is arranged between the armature compartment base and the armature. During correspondingly precise machining it is advantageously possible to dispense with these components.

It may be understood that a distance piece should be understood in particular to be a component which increases a distance between a surface of the magnetic core and another component, in particular an armature, a sliding sleeve or a control piston. In embodiments according to the prior art manufacturing tolerances are typically compensated for by the provision of such distance pieces.

Furthermore, in the invention it is advantageously provided that the armature is formed by an armature cylinder and an armature body, wherein the armature cylinder has a larger diameter than the armature body, and the armature body in the first position bears against the armature compartment base.

The armature can be constructed very variably. First of all it is possible that the armature only consists of a geometric main body, for example a cylinder, which is guided in the armature compartment. It is also possible to construct the armature from two different main bodies, an armature cylinder and an armature body, and to use the element with the smaller diameter, the armature body, for the mounting of the armature to be inserted.

In a preferred embodiment of the invention it is provided that the armature bar is formed integrally with the armature or the armature bar is arranged floating relative to the armature. Alternatively it is provided that the armature bar is formed integrally with the control piston or the armature bar is arranged floating relative to the control piston. The configuration of the armature, the armature bar and the control piston relative to one another is very flexible according to the invention. The parts can in each case be configured individually, that is to say floating relative to one another. The parts are then moved due to their reciprocal contact, and where appropriate the restoring spring ensures abutment of the individual elements. However, it is also possible to provide an integral component consisting of the armature, the armature bar and the control piston.

Furthermore, it is provided that the magnetic core is formed like a cup and the armature compartment base forms the base of this cup, which is adjoined by an armature compartment wall, and the armature compartment wall has, on the end facing away from the armature compartment base, a control cone which interacts with the armature, in particular the armature body. The magnetic core has also the function of conducting the magnetic flux. The required control behavior is implemented by the interaction of the armature with the control cone.

Therefore corresponding exact machining is already provided for the control cone, and also the armature compartment base should be positioned precisely, which advantageously takes place in a processing step or a machining sequence with unchanged clamping of the magnetic core.

It is advantageously provided that the housing has a fixing recess for the sliding sleeve, wherein the bearing surface is arranged in the fixing recess. Both the fixing recess and also the bearing surface are provided on the side of the magnetic core facing away from the armature compartment. The fixing recess offers a guide for the sliding sleeve. Therefore this production/machining advantageously takes place in a machining step or a machining sequence with unchanged clamping of the magnetic core.

In an advantageous embodiment it is provided that in the second position of the electromagnet the armature cylinder is located at the start of the control cone.

In a further preferred embodiment it is provided that the armature compartment base and the bearing surface are oriented parallel to one another.

Furthermore, it is advantageous that the armature compartment base and/or the bearing surface are each designed as a cone.

Various alternatives are proposed for configuring the magnetic core and thus providing an exact reciprocal position of the armature compartment base, on the one hand, and of the bearing surface, on the other hand. The cone-like configuration, in particular of the armature compartment base, also makes it possible where appropriate to use additional magnetic characteristics. However, the cone also enables radial guiding of the respective element. In this case it is possible to provide both an inner cone and also an outer cone. Naturally it is also possible for mixed forms of the proposed variants, that is to say the planar surface on the one hand (as armature compartment base or bearing surface) and the cone (as bearing surface or armature compartment base) on the other hand, to be combined with one another.

Furthermore, the invention also comprises the use of a valve, as described, in an inlet-side pressure range from 1 bar to 40 bars, preferably in an inlet-side pressure range from 1.5 bar to 35 bars, in particular preferably in an inlet-side pressure range from 2 bars to 25 bars.

The ability of the valve according to the invention to cover a pressure range, in which the lowest pressure and the highest pressure differ by the factor 10, and in this case to maintain the high repetition quality of the current/pressure characteristic at different pressures, constitutes the value of this invention. Surprisingly, this result is achieved with fewer components, since an adjusting device for the location of the armature relative to the armature compartment base is not required. Therefore the invention should also be produced more favorably, since the increased cost is overcompensated during the production of the savings of the adjusting device which is not required.

For the parameter of pressure a range is given which is described by an upper and lower limit. In this case the following values are provided, for example, as the upper limit: 50 bars, 45 bars, 40 bars, 35 bars, 30 bars, 25 bars, 20 bars and 15 bars. The following values apply, for example, as the lower limit: 0.5 bar, 1 bar, 1.5 bars, 2 bars, 2.5 bars, 3 bars, 4 bars, 5 bars, 7 bars, 9 bars. The disclosure of this application covers all of the ranges which consist of all possible technically correct combinations of the aforementioned upper and lower limits.

In this connection it is pointed out, in particular, that all features and characteristics but also procedures described with regard to the valve are also transferable analogously in relation to the formulation of the use according to the invention and can be employed in the context of the invention and may be regarded as also disclosed hereby. The same also applies conversely, in other words structural features, i.e. features in apparatus terms, which are only mentioned with regard to the use thereof can also be taken into account and claimed in the context of the apparatus claims for the valve, and are likewise included in the disclosure.

BRIEF DESCRIPTION OF THE DIFFERENT VIEWS IN THE DRAWINGS

Figure 2:
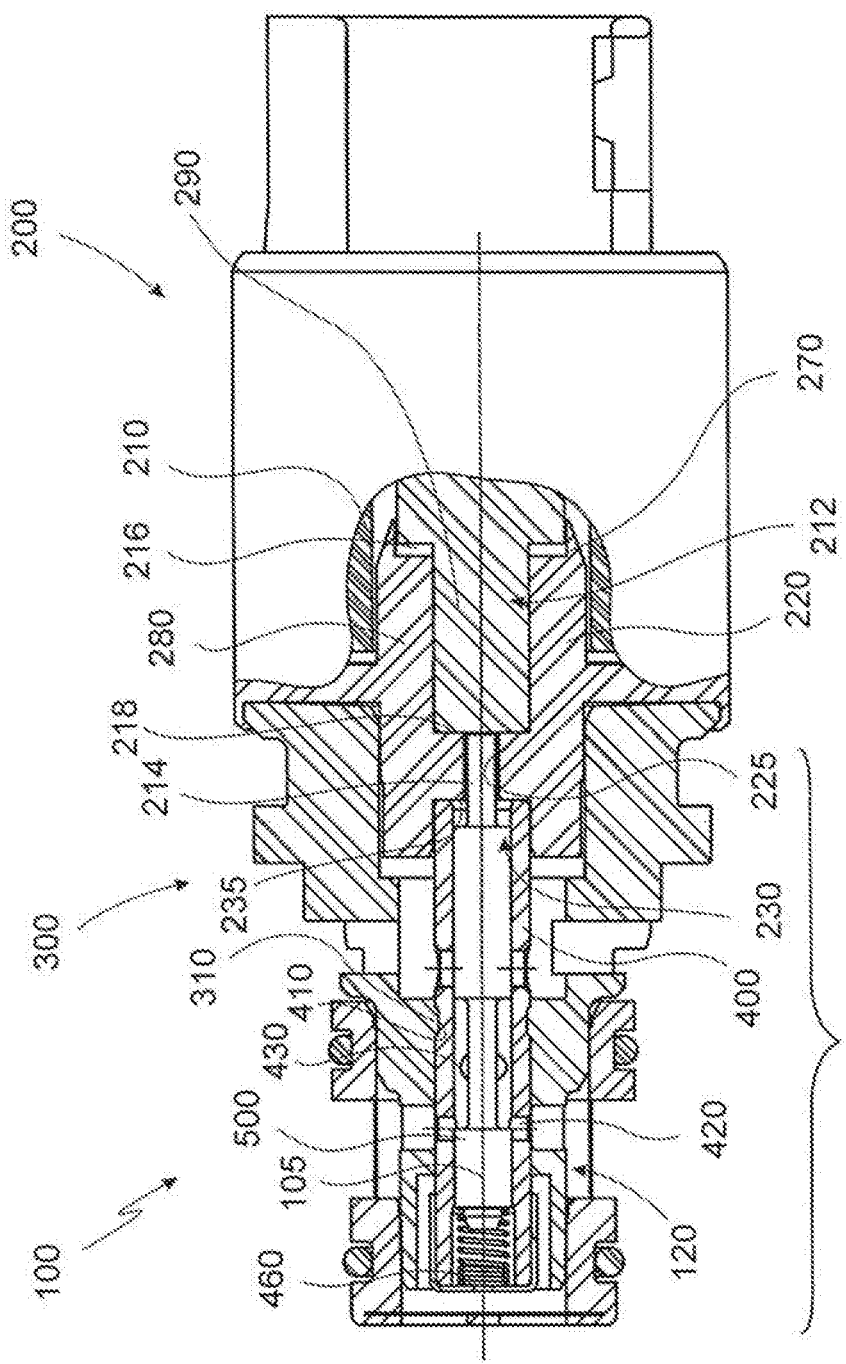

The invention is illustrated schematically, in particular, in one exemplary embodiment in the drawings. In the drawings:

FIG. 1 shows a sectional view of a valve according to the invention in a second position of the electromagnet thereof, FIG. 2 shows a sectional view of a valve according to the invention in a first position of the electromagnet thereof.

DETAILED DESCRIPTION OF THE PREFERRED EMBODIMENT

In the drawings the same or corresponding elements are in each case designated by the same reference numerals and therefore are not described again unless this is expedient. The disclosures contained in the entire description can be transferred analogously to parts which are the same with the same reference numerals or the same component designations. Also the positional details selected in the description, such as for example top, bottom, side, etc., relate to the drawing immediately described and illustrated and may be transferred to the new position in the event of a change in position. Furthermore, individual features or combinations of features of the different illustrated and described exemplary embodiments may also constitute separate independent or inventive solutions or solutions according to the invention.

The valve 100 is shown in both figures in two different positions.

FIG. 1 shows the currentless state (position) of the electromagnet, wherein the armature 212 is shifted completely to the right by the unstressed restoring spring 460, and in this second position the control piston 500 bears against the bearing surface 235, as does the sliding sleeve 400. In FIG. 1 the control piston 500 closes the pressure connection opening 420, and the valve is shut off.

FIG. 2 shows the state (position) of the electromagnet in which it is supplied with current, wherein the armature 212 is shifted to the left towards the restoring spring 460 by the magnetic force generated by the coil, and in the first position of the electromagnet the armature 212 bears against the armature compartment base 218 (as a travel limitation). In FIG. 2 the control piston 500 clears the pressure connection opening 420, and the valve is opened.

The valve 100 extends along a longitudinal axis 105. The valve 100 is designed to be substantially rotationally symmetrical about the longitudinal axis 105, wherein deviations from the rotational symmetry do occur, for example at connections.

The valve 100 has a housing 200, which is illustrated from the exterior in FIG. 1.

An electromagnet 210 is located in the housing 200. This is only partially visible in the drawings, since it is for the most part covered by the housing 200.

The electromagnet 210 has an armature 212. An armature bar 214 is mounted on the armature. The armature 212 is movable linearly along the longitudinal axis 105 in an armature compartment 216.

In order to drive the armature 212 the electromagnet 210 has a coil which, in the drawings, is covered by the housing 200 and therefore cannot be seen.

The electromagnet 210 also has a magnetic core 220. As shown, this extends somewhat out of the housing 200 and closes the cup-like housing 200 in the direction of the valve housing 300.

A fixing recess 230 is formed in the magnetic core 220, facing the valve part 3. The function thereof will be described below. A bearing surface 235, which forms a base of the fixing recess 230, is formed in the fixing recess 230. On the side facing away from the valve part 3 (in the electromagnet 210 or housing 200) the magnetic core forms a cup-like structure which at least partially delimits the armature compartment 216. This cup-like structure includes the armature compartment base 218 which is adjoined at right angles, in the direction of the longitudinal axis 105, by the cylindrical armature compartment wall 280. This armature compartment wall 280 has, on its end facing away from the armature compartment base 218, a radially outwardly directed shoulder, which is adjoined by a control cone 270 formed as an outer cone. FIG. 1 shows that in this position the armature cylinder 290 is positioned on the tip or end of the control cone 270. The armature compartment base 218 defines the left end position of the armature 212, wherein the armature 212 in this case bears directly against the armature compartment base 218. No further components such as springs or distance pieces are located between the armature compartment base 218 and the armature 212.

Furthermore, in the magnetic core 220 a penetrating bore 225 is formed, which connects the armature compartment 216 to the fixing recess 230. The armature bar 214 extends from the armature 212 through the penetrating bore 225.

In this case the penetrating bore 225 connects the bearing surface 235 to the armature base 218. It can be readily seen that advantageously the bearing surface 235 and the armature base 218 are produced simultaneously or in the same clamping operation, in order to achieve very high precision here. On this very precisely created bearing surface 235, in addition to the control piston 500 (in the second position—see main claim—or according to FIG. 1) the sliding sleeve 400 is also supported, so that the two elements which have to co-operate for implementation of the valve function relate to the same surface, the bearing surface 235, and thus manufacturing tolerances are minimized.

In the present case the housing 200 is made of metal.

Furthermore, the valve 100 has a valve housing 300. This is made of plastic in the present case. The valve housing 300 is preferably produced as a plastic injection molded part.

Moreover, the valve 100 has a sliding sleeve 400. This is made of metal in the present case.

The valve housing 300 surrounds the sliding sleeve 400. In this case the sliding sleeve 400 is oriented so that it extends along the longitudinal axis 105.

The sliding sleeve 400 is accommodated in the aforementioned fixing recess 230 and is stabilized thereby in directions transversely with respect to the longitudinal axis 105. In this case the sliding sleeve 400 bears against the bearing surface 235 and is prevented by the bearing surface 235 from moving towards the right.

In the sliding sleeve 400 a circumferentially encircling groove 410 is formed on the outside. Complementary to this, a bead 310 which engages in the groove 410 is formed on the valve housing 300. Thus the sliding sleeve 400 and the valve housing 300 are connected to one another by form-fitting. In particular, the sliding sleeve 400 can no longer be displaced along the longitudinal axis 105 relative to the valve housing 300. This applies in both directions along the longitudinal axis 105, but in particular in the direction of the housing 200. Reference may also be made to the fact that the valve housing 300 is blocked against displacement on the sliding sleeve 400.

The valve 100 has a pressure connection 120, a working connection 130 and a tank connection 140.

The pressure connection 120 is formed radially at the side of the valve 100. It serves for delivering a pressurized fluid which should be controlled by means of the valve 100. The fluid may for example be a gas or a liquid.

The working connection 130 is formed on the end face. It is laterally delimited by a filter basket 110, which rests on the valve housing 300. The filter basket 110 carries a filter, by means of which fluid exiting from the working connection 130 can be filtered. A filter is also provided for the pressure connection 120.

The fluid exiting from the working connection 130 can be used, for example, for various control action or drive purposes, for example in an automatic transmission of a motor vehicle.

The tank connection 140 is also formed radially at the side of the valve 100. In particular a conduit leading to a tank can be connected to said tank connection, so that fluid can be delivered to the tank.

The working connection 130 is connected to a working connection opening 430 in the sliding sleeve 40. In this case the working connection opening 430 is partially concealed by the control piston 500. The connection between the working connection opening 430 and the working connection extends in the axial direction relative to the longitudinal axis 105 and is rotated by 90° relative to the view according to FIG. 1/FIG. 2.

Furthermore, a pressure connection opening 420 is formed in the sliding sleeve 400. This pressure connection opening 420 is connected to the pressure connection 120 and ensures that the fluid from the pressure connection 120 enters the interior of the sliding sleeve 400.

Moreover, a tank connection opening 440 which is connected to the tank connection 140 is formed in the sliding sleeve 400. The tank connection opening 440 ensures that fluid from the interior of the sliding sleeve 400 enters the tank connection 140.

The working connection opening 430 between the tank connection opening 440 and the pressure connection opening 420 is located in the sliding sleeve 400.

The sliding sleeve 400 bears directly against the bearing surface 235. Thus its location is defined by the machining of the magnetic core 220. No distance pieces, springs or other components are located between the sliding sleeve 400 and the bearing surface 235.

A control piston 500 is located in the interior of the sliding sleeve 400. As shown, this is structured so that it can selectively connect the connections 120, 130, 140 to one another. In the central region it has a taper in order to form a through-flow channel. The through-flow channel is delimited by control edges of the control piston 500.

In the position illustrated in FIG. 1 the working connection 130 is connected to the tank connection 140, whilst the pressure connection 120 is shut off. In this case the control piston 500 bears directly against the bearing surface 235, with no components such as a spring or a distance piece being located between them. If the control piston 500 is moved towards the left by means of the electromagnet 210, the working connection 130 is connected to the pressure connection 120, whilst the tank connection 140 is shut off. This corresponds to a conventional functionality of a valve. Thus, on the basis of the described configuration this is a slide valve. However, it should be pointed out that the configuration according to the invention can be applied not only in slide valves, but in all types of valves. The description in the context of a slide valve is given here merely by way of example.

A support cap 450 is mounted at the left-hand end of the sliding sleeve 400. This closes the sliding sleeve 400.

A restoring spring 460 is arranged between the support cap 450 and the control piston 500. This spring is supported on the support cap 450 and pushes the control piston 500 towards the right. Thus, without an application of force by the electromagnet 210 the control piston 500 remains in the position illustrated in FIG. 1. If, on the other hand, the aforementioned coil of the electromagnet 210 is supplied with current, the armature 212 is moved towards the left. This movement is transmitted by means of the armature bar 214 to the control piston 500, which likewise is moved towards the left against the force of the restoring spring 460. As a result the valve 100 can be actuated in the usual way.

Although the invention has been described with reference to precise exemplary embodiments, which are set out in the greatest detail, it is pointed out that this only serves for explanation and that the invention is not necessarily limited thereto, since alternative exemplary embodiments and procedures are clear to persons skilled in the art with reference to the publication. Accordingly, amendments may be considered which can be carried out without deviation from the content of the described invention.

The invention claimed is:

1. A sliding valve, comprising
a housing which accommodates an electromagnet having a magnetic core, wherein a portion of the housing is formed from the magnetic core;
a valve housing which accommodates a valve part and is directly connected to the housing at a cooperatively engaged interface and has a bead interface on an inside diameter of the valve housing that extends inward towards a longitudinal axis, wherein the magnetic core in the electromagnet forms an armature compartment base which delimits an armature compartment and against which an armature movably mounted in the armature compartment bears in a first position of the electromagnet and wherein the magnetic core has a penetrating bore in the region of the armature compartment to accommodate an armature bar operatively connected to the armature; and
a metal sleeve centrally disposed along the longitudinal axis within the valve housing and cooperatively engaged with the valve housing at the bead interface by form-fitting the bead in a groove where the groove disposed on the outside diameter of the sleeve, and wherein
the magnetic core portion of the housing has at least one bearing surface, against which the metal sleeve bears, and the penetrating bore opens into the bearing surface and a control piston movable against the force of a restoring spring is arranged in the metal sleeve, is operatively connected to the armature bar and bears against the bearing surface in a second position of the electromagnet.

2. The valve according to claim 1, wherein the magnetic core is formed in one piece.

3. The valve according to claim 1, wherein the magnetic core is machined from one single blank.

4. The valve according to claim 1, wherein no spring and/or no distance piece is arranged between the control piston and the bearing surface.

5. The valve according to claim 1, wherein no spring and/or no distance piece is arranged between the metal sleeve and the bearing surface.

6. The valve according to claim 1, wherein the armature compartment base is formed directly on the magnetic core.

7. The valve according to claim 1, wherein no spring is arranged between the armature compartment base and the armature.

8. The valve according to claim 1, wherein no distance piece is arranged between the armature compartment base and the armature.

9. The valve according to claim 1, wherein at no adjusting device is provided for the location of the armature relative to the armature compartment base in the second position of the electromagnet.

10. The valve according to claim 1, wherein the armature is formed by an armature cylinder and an armature body, wherein the armature cylinder has a larger diameter than the armature body, and the armature body in the first position bears against the armature compartment base.

11. The valve according to claim 10, wherein in the second position of the electromagnet the armature cylinder is located at the start of the control cone.

12. The valve according to claim 1, wherein the armature bar is formed integrally with the armature or the armature bar is arranged floating relative to the armature.

13. The valve according to claim 1, wherein the armature bar is formed integrally with the control piston.

14. The valve according to claim 1, wherein the armature bar is arranged floating relative to the control piston.

15. The valve according to claim 1, wherein the magnetic core is formed like a cup and the armature compartment base forms the base of this cup, which is adjoined by an armature compartment wall, and the armature compartment wall has, on the end facing away from the armature compartment base, a control cone which interacts with the armature.

16. The valve according to claim 1, wherein the housing has a fixing recess for the metal sleeve, wherein the bearing surface is arranged in the fixing recess.

17. The valve according to claim 1, wherein the armature compartment base and the bearing surface are oriented parallel to one another.

18. The valve according to claim 1, wherein the armature compartment base and/or the bearing surface are each designed as a cone.

19. A use of a valve according to claim 1 in an inlet-side pressure range from 1 bar to 40 bars.

* * * * *